United States Patent [19]

Peck

[11] 4,269,459
[45] May 26, 1981

[54] WHEEL BEARING SLINGER RING

[75] Inventor: Clifton S. Peck, Trenton, Mich.

[73] Assignee: Chrysler Corporation, Highland Park, Mich.

[21] Appl. No.: 129,131

[22] Filed: Mar. 10, 1980

Related U.S. Application Data

[62] Division of Ser. No. 973,059, Nov. 26, 1978.

[51] Int. Cl.³ ............................................. F16C 33/78
[52] U.S. Cl. ............................... 308/36.4; 308/187.1; 308/189 R
[58] Field of Search ............... 308/36.4, 187.1, 189 R, 308/16, 36.1, 187.2, 178, 187; 277/DIG. 4

[56] References Cited

U.S. PATENT DOCUMENTS

| 3,510,138 | 5/1970 | Bowen et al. | 308/36.4 |
| 3,809,177 | 5/1974 | Pirochta | 308/187.1 |
| 4,010,986 | 3/1977 | Otto | 308/16 |
| 4,093,324 | 6/1978 | Carrigan | 308/187.1 |

Primary Examiner—Lenard A. Footland
Attorney, Agent, or Firm—Newtson & Dundas

[57] ABSTRACT

A drive steer axle is bearing supported in a journal member movably supported in a vehicle body. A bearing retaining shoulder and an axle concentric counterbore are formed in the journal member to cooperate with a slinger ring carried for rotation with the axle and having a radially extending tip portion in axial registration with the counterbore to prevent fluid contamination of the bearing.

11 Claims, 2 Drawing Figures

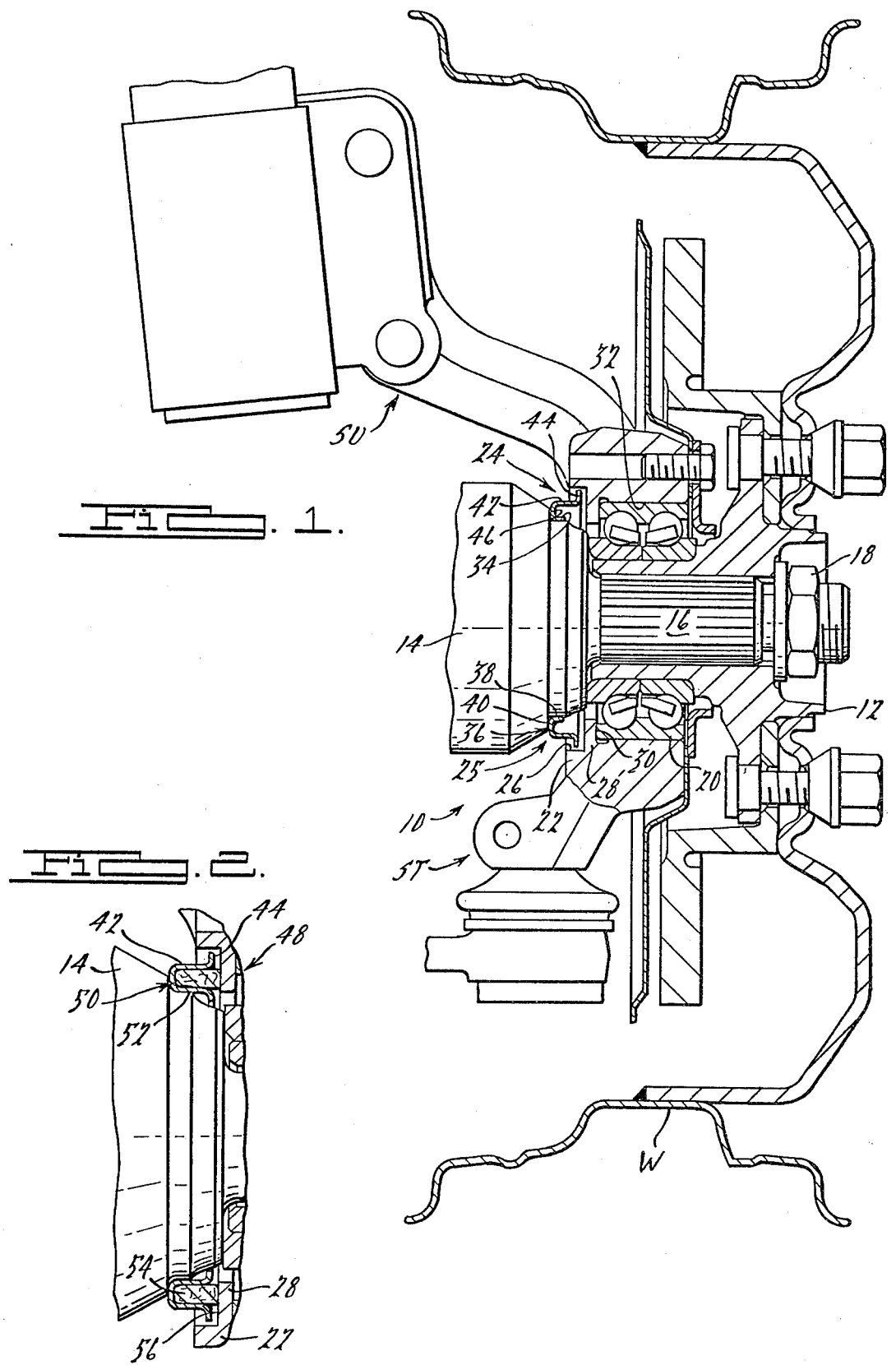

WHEEL BEARING SLINGER RING

This is a division, of application Ser. No. 973,059, filed Dec. 26, 1978.

BACKGROUND OF THE INVENTION

1. Field of Invention

The present invention relates generally to vehicle wheels and more particularly to contaminant protective shields for the bearings thereof.

2. Description of the Prior Art

In front wheel drive vehicles, wheel bearings are carried in journal members non-rotatively mounted in the vehicle, and the wheels are driven by drive steer axle members supported by the bearings. The axle members, of course, are relatively rotatable with respect to the journal member such that an inward facing gap communicating with the area in which the bearings are mounted necessarily exists. Since driving over wetted surfaces, as during inclement weather conditions, will tend to result in fluid contaminants' entering the bearings from the inner side of the wheel structure or associated vehicle components, various devices such as packings, labyrinth seals and the like have been employed to protect the bearings.

SUMMARY OF THE INVENTION

Responsive to the deficiencies in the prior art, the present invention provides an effective and economical slinger-type contaminant protective means which employes a generally cup-shaped slinger ring having a simple radially extending portion cooperative with an economically formed counterbore in a wheel bearing journal member concentric with the axle's axis of rotation to prevent fluid contamination of the bearing. The cup-shaped configuration of the slinger ring permits easy installation of a static seal member in one embodiment to provide further assurance of freedom from contamination in the wheel bearing.

It is accordingly an object of the present invention to provide a simple, economical, and effective wheel bearing contaminant protective device.

BRIEF DESCRIPTION OF THE DRAWINGS

This and other objects and features of the present invention will become apparent to those skilled in the art upon reading the following detailed description of the preferred embodiments with reference to the accompanying drawing in which:

FIG. 1 is a cross sectional view of a vehicle wheel bearing assembly embodying the slinger means of the present invention; and FIG. 2 is a partial cross sectional view of a vehicle wheel bearing assembly embodying an alternate embodiment of the slinger means of the present invention.

DESCRIPTION OF THE PREFERRED EMBODIMENTS

Turning first to FIG. 1, a wheel assembly 10 of the type employed in front wheels of front wheel drive vehicles is illustrated. It will be appreciated by those skilled in the art as the description progresses that the particular assembly shown at 10 is intended to be exemplary only and not limiting with respect to the present invention, which is defined by the appended claims.

The wheel assembly 10 is illustrated as comprising, generally, a wheel W carried for rotation with a hub member 12; a drive/steer axle member 14 drivingly engaging the hub member 12 as through a spline connection 16 and outwardly axially retained by a threaded fastener; a bearing member 20 rotatively supporting the hub member 12 and axially interposed between the hub member 12 and the axle member 18; a journal member 22 for receiving the bearing 20 and connectable to the vehicle steering system as indicated at ST and to the vehicle suspension system as indicated at SU, and a contaminant protective slinger device 24 carried between the axle member 18 and the journal member 22.

The slinger device 24 of the present invention is positioned and constructed to resist the ingestion of fluid and fluid borne contaminants through the gap 25 between the journal member 22 and the axle member 14 from the inboard (right as viewed in FIG. 1) side of the wheel structure during operation in inclement weather. The manner in which this is accomplished in the wheel assembly 10 will now be considered in greater detail.

A counterbore 26 is formed at the inner side of the journal member 22, terminating in an annular inwardly extending ledge 28 which provides an inner axial abutment surface 30 for the bearing 20. The counterbore 26 is formed concentrically with a bore 32 in which the bearing 20 is mounted.

The axle member 14 includes mounting portion 34 formed concentric with its axis of rotation and axially proximate counterbore 26 in the assembled position shown in FIG. 1. A slinger member 36 is carried for rotation with the axle member 14 on the mounting surface 34.

This slinger member 36, as may be seen in FIG. 1, is generally cup shaped and has a preferably generally U-shaped cross section. It includes a base portion 38, a locating portion 40, a linking portion 42, and a tip portion 44. The base portion 38 is received in tightly fitting relationship (preferably press fit) on the mounting portion 34 of axle member 14. It may be slid on to the assembled position shown where the radially extending locating portion 40 abuts the shoulder 46 which terminates the mounting portion 34. The linking portion 42 is preferably cylindrical and extends axially to a position within the counterbore 26 when assembled as shown in FIG. 1. The tip portion 44 extends radially outwardly from the free outer end of the linking portion 42 and defines an annular, disc-like portion in close proximity to the diametral surface of the counterbore 26.

The simple slinger means configuration described provides effective and economical protection for the bearing 20 in that with the vehicle in motion the axle member 14 drives the wheel W while the journal member 22 remains rotatively stationary, thus centrifugally ejecting fluid contaminants tending to enter the gap 25 by movement of the linking and tip portions 42, 44 of slinger member 36. With the vehicle at rest, fluid draining from wetted parts is inhibited from reaching the bearing 20 by the close conformity of the tip portion 44 with the counterbore 26.

The FIG. 2 embodiment is substantially the same as the FIG. 1 embodiment, but is configured to provide a backup seal means 48 for preventing the ingestion of certain types of contaminants which may, under certain conditions, pass through a slinger means such as that of the FIG. 1 embodiment. It has been noted that when vehicles are operated under conditions in which flowing mud or slush are present, a contaminant slurry may be forced past a slinger device. To combat this phenomenon, a slinger member 50, as shown in FIG. 2, wherein numerals identical to those of the FIG. 1 embodiment refer to identical parts or portions, is constructed which includes a modified support portion 52 extended axially coextensive with the linking portion 42 to define an annular U-shaped channel for receiving a seal element 54. The element 54 is preferably formed as a cylindrical felt ring urged into abutting relationship with the preferably smooth outer surface 56 of ledge 28 of journal member 22 to provide a substantially impervious barrier to the ingestion of the contaminant slurry.

While only two embodiments of the invention have been described, others may be possible without departing from the scope of the appended claims.

What is claimed is:

1. In a wheel bearing assembly for a vehicle having an inner axle member, an outer journal member supported by the body of the vehicle, a bore formed through the journal member, a bearing carried in the through bore for rotatively supporting the axle member, and annular slinger ring means operatively carried intermediate said axle member and said journal member for preventing the ingestion of contaminating fluid from outside the assembly into the bearing, an improvement wherein said slinger means comprises:
   A. means integrally formed with said journal member for defining an annular shoulder proximate the inner terminus of said through bore for preventing certain inward movement of said bearing;
   B. means defining a counterbore in said journal member extending inwardly from said shoulder and substantially concentric with said through bore;
   C. means defining an outer diameter surface on said axle member at an axial position proximately inboard said journal member counterbore;
   D. a generally cup-shaped annular slinger member carried for rotation with said axle member and including
      1. an axially extending support portion received in interference fit relationship on said axle member diametral surface; and
      2. an annular radially extending tip portion received in closely fitting clearance relationship within said journal member counterbore; and
   E. secondary seal means carried by said slinger member and operatively engaging said journal member to substantially prevent passage of fluid past said slinger member to said bearing.

2. The improvement as defined in claim 1 wherein said slinger member further comprises:
   F. means defining an annular cup portion for interconnecting said support portion and said tip portion.

3. The improvement as defined in claim 2 and further comprising:
   G. means defining a substantially smooth radially extending annular surface at the outer terminus of said journal member counterbore; and
   H. a compliant seal member carried in said cup portion and engaging said counterbore annular surface in sealing relationship.

4. The improvement as defined in claim 3 wherein said seal member comprises a cylindrical felt member.

5. A wheel bearing assembly for a vehicle comprising:
   A. an outer journal member non-rotatively connected to the body of the vehicle and having a bore formed therethrough for mounting a wheel bearing;
   B. an inner axle member rotatively drivingly connected to the wheel, journaled in said bearing, and having surfaces defining with said journal member a gap communicating with said bearing bore;
   C. a slinger member carried for rotation with said axle member within said gap for centrifugally ejecting fluid introducing into said gap outward from said bearing; and
   D. secondary seal means carried by said slinger member and operatively engaging said journal member to effect a substantially fluid-tight seal therebetween.

6. A wheel bearing assembly as defined in claim 5 wherein said journal member includes means defining a radially extending annular surface in said gap inwardly adjacent said bearing and said seal means comprises a substantially cylindrical compliant member.

7. A wheel bearing assembly as defined in claim 6 wherein said compliant member is fabricated from felt.

8. A wheel bearing assembly for a vehicle comprising:
   A. an outer journal member non-rotatively connected to the body of the vehicle and having a bore formed therethrough for mounting a wheel bearing;
   B. an inner axle member rotatively drivingly connected to the wheel, journaled in said bearing, and having surfaces defining with said journal member a gap communicating with said bearing bore;
   C. slinger means including:
      1. means integrally formed with said journal member for defining an annular shoulder proximate the inner terminus of said through bore for preventing certain inward movement of said bearing;
      2. means defining a counterbore in said journal member extending inwardly from said shoulder and substantially concentric with said through bore;
      3. means defining an outer diametral surface on said axle member at an axial position proximately inboard said journal member counterbore; and
      4. a generally cup-shaped annular slinger member carried for rotation with said axle member and including
         1. an axially extending support portion received in interference fit relationship on said axle member diametral surface; and
         2. an annular radially extending tip portion received in closely fitting clearance relationship within said journal member counterbore; and
   D. secondary seal means carried by said slinger member and operatively engaging said journal member to substantially prevent passage of fluid past said slinger member to said bearing.

9. The wheel bearing assembly as defined in claim 8 wherein said slinger member further comprises:
   E. means defining an annular cup portion for interconnecting said support portion and said tip portion.

10. The wheel bearing assembly as defined in claim 9 and further comprising:
    F. means defining a substantially smooth radially extending annular surface at the outer terminus of said journal member counterbore; and
    G. a compliant seal member carried in said cup portion and engaging said counterbore annular surface in sealing relationship.

11. The improvement as defined in claim 10 wherein said seal member comprises a cylindrical felt member.

* * * * *